(12) United States Patent
Tabata

(10) Patent No.: US 6,804,427 B2
(45) Date of Patent: Oct. 12, 2004

(54) OPTICAL SWITCH

(75) Inventor: Seiichiro Tabata, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 379 days.

(21) Appl. No.: 10/123,306

(22) Filed: Apr. 17, 2002

(65) Prior Publication Data
US 2003/0044104 A1 Mar. 6, 2003

(30) Foreign Application Priority Data
Sep. 3, 2001 (JP) .................................. 2001-265292

(51) Int. Cl.⁷ .............................................. G02B 6/26
(52) U.S. Cl. ........................ 385/16; 385/17; 385/18; 250/227.22
(58) Field of Search ...................... 385/15–18, 24, 385/13, 180; 250/227.21, 227.22

(56) References Cited

U.S. PATENT DOCUMENTS

| | | | | |
|---|---|---|---|---|
| 5,187,758 A | * | 2/1993 | Ueda et al. ................ | 385/16 |
| 5,261,015 A | * | 11/1993 | Glasheen ................... | 385/23 |
| 5,699,462 A | * | 12/1997 | Fouquet et al. ............ | 385/18 |
| 6,519,381 B2 | * | 2/2003 | Hatta et al. ................ | 385/16 |
| 6,658,176 B2 | * | 12/2003 | Amantea .................... | 385/16 |

FOREIGN PATENT DOCUMENTS

| | | |
|---|---|---|
| JP | 2-136805 | 5/1990 |
| JP | 10-90735 | 4/1998 |
| JP | 11-337850 | 12/1999 |

OTHER PUBLICATIONS

J.E. Fouquet, "Compact Optical Cross–Connect Switch Based on Total Internal Reflection in a Fluid–Containing Planar Lightwave Circuit", Optical Fieber Communication Conference, Mar. 7, 2000.

* cited by examiner

Primary Examiner—Vip Patel
Assistant Examiner—Dalei Dong
(74) Attorney, Agent, or Firm—McDermott Will & Emery LLP

(57) ABSTRACT

Piezoelectric members are arranged in a rectangular array of 32 columns and 32 rows and a polyimide film is sandwiched at front and back sides thereof by spacers having through-holes formed only around cross-points of optical waveguides therebetween. An end of a piezoelectric member in the shape of a plate is fixed to the polyimide film with the spacer interposing therebetween. As an opening/closing operation mechanism for a cut section for change-over between propagation directions of light, there is used piezoelectric member constituted of a piezoelectric element capable of pressing a region around a cross-point point of optical waveguides from one side to the other side. With such a construction adopted, there can be obtained an optical switch capable of not only reducing an optical loss, but also preventing a change-over abnormality and burning from occurring and in addition, capable of further downsizing.

7 Claims, 9 Drawing Sheets

OPTICAL SWITCH

BACKGROUND OF THE INVENTION

1. Field of the Invention

The present invention relates to an optical switch for use in change-over between optical paths in an optical communication facility.

2. Description of the Background Art

Referring to FIG. 12, description will be given of a prior art optical switch 100. Optical switch 100 is one shown in TuM1 (reported by J. E. Fouquet, entitled "Compact Optical Cross-Connect Switch Based on Total Internal Refection in a Fluid-Containing Planar Lightwave Circuit") in OFC 2000 (Optical Fiber Communication Conference, Mar. 7, 2000). Optical switch 100 is constituted of a silica planar optical circuit substrate 51 and square optical waveguides each with a slightly higher refractive index are formed in silica planar optical circuit substrate 51, thereby forming a two-dimensional optical circuit.

Generally speaking, silica planar optical circuit substrate 51 in use is of a refractive index of the order of 1.5 and an optical waveguide 2 is made of a material with a refractive index higher by a value of the order of 1% than that of substrate 51. A portion of optical waveguide 2 is usually called a core as well. A trench 52 is formed so as to traverse optical waveguides 2 at a cross-point thereof where both partly overlap, and filled with a refractive index matching oil 56. Refractive index matching oil 56 has a refractive index equal to that of optical waveguide 2.

Description will be given of operation of optical switch 100. Optical switch 100 has a bubble generation mechanism not shown, which can generate or thereafter again make extinct a bubble 53 within refractive index matching oil 56 at the cross-point of optical waveguides 2. The bubble generation mechanism can adopt a mechanism similar to that for use in a bubble jet (R) printer head.

When generated bubble 53 is present at a cross-point, all the energy of incident light on the cross-point is reflected by a surface of bubble 53, while contrary to this, when no bubble 53 is present there, light propagates straight through the cross-point since optical waveguide 2 and refractive index matching oil 56 have the same refractive index as each other. By utilizing this nature associated with generation and extinction of bubble 53, optical paths can be changed over between two states of reflection and straight propagation, respectively.

In optical switch 100 constructed as described above, a width of trench 52 was required to be at least a value of the order of 15 $\mu$m in consideration of precision in etching process. Furthermore, there was a problem that an optical loss of at least 0.07 dB per cross-point arises. All the optical loss L in optical switch 100 is given by the following formula:

$$L=2C+(m-1)T+(n-1)T+R$$

where m is the number of input ports, n is the number of output ports, C is a combined loss occurring when light is launched into an optical switch from an optical fiber and thereafter, in passage through an optical waveguide till an active region, which is at a cross-point, T is a loss [dB] occurring in the course where light traverses one trench and propagates across a section of a short optical waveguide between two adjacent cross-points, and R is a loss caused by reflections at sidewalls in an empty trench and propagation across a section of a short optical waveguide between two adjacent cross-points.

For example, in a case where an optical switch on as large a scale as a 1000 times 1000 array is desired to be constructed, all the optical loss, when detailed data is substituted into the formula, is given as follows:

$$L=2\times0.25+(1000-1)\times0.07+(1000-1)\times0.07+2.1=142.46\ dB$$

Therefore, all the optical loss of 142.46 dB still occurs even in a case where the optical switch is fabricated in ideal conditions. In order to cause an optical switch to normally function as such without degrading a signal quality, a necessity is to restrict the optical loss to 10 dB or lower. When considering such an optical loss, there was a problem of difficulty in fabricating an optical switch on a scale larger than of the order of a 32 times 32 array if such a construction is adopted.

Worse yet, since silica planar optical circuit substrate 51 is fabricated using apparatuses similar to those for use in a case of a semiconductor device, a problem was present that a large size optical switch required a very high cost. In addition, since bubble 53 is utilized that is generated each time within refractive index matching oil 56 it becomes necessary, a problem arose that bubble 53 generated was small or shifted out of place to thereby generate optical path change-over abnormality. Moreover, a problem was present since a local light absorption occurs in small particles of refractive index matching oil 56 according to a state of refractive index matching oil 56, with the result that a peripheral region around an optical path is burned by the energy of signal light.

Furthermore, since a prior art optical switch has a physical limitation on compactness, there has been a request for an optical switch of a construction capable of downsizing itself.

SUMMARY OF THE INVENTION

It is an object of the present invention to provide an optical switch capable of reducing an optical loss without generating the change-over abnormality or the burning described above. It is another object of the present invention to provide an optical switch capable of further downsizing itself.

An optical switch of the present invention includes: a plate member, constituted of an elastic material, and having first and second optical waveguides intersecting with each other at a cross-point in the interior thereof and a cut formed so as to traverse the cross-point; and press means, provided on at least one of upper and lower sides of main surfaces of the plate member, and pressing the cut to open or close the cut, wherein when the cut is open, light propagating through the first optical waveguide is reflected by an inner wall surface of the cut to then, propagate through the second optical waveguide, while when the cut is close, light passes through the cut to keep on propagating straight through the first optical waveguide and the press means is formed from an piezoelectric member that deforms according to an pizoelectric effect.

According to the above construction, not only can an optical loss be reduced, but also change-over abnormality and burning can be prevented from occurring. Furthermore, since the press means is made from a piezoelectric material deformed by a piezoelectric effect, the optical switch can be downsized.

An optical switch of the present invention more preferably has the piezoelectric member including: a fixed part fixed to the plate member; and a moving part not fixed to the plate member, wherein a position of the moving part changes upward or downward relative to the fixed part by a piezoelectric effect, such that the moving part presses the cut. With such a construction adopted, the fixed part is fixed to the plate member to thereby enable a press force required with certainty to be given to a cut, since a position of the piezoelectric member relative to the plate member is the same at all times even if a flatness of the plate member is not kept.

An optical switch of the present invention has the press means constituted of a piezoelectric sheet having fixed parts and moving parts, wherein each of the moving parts may be formed using one of portions formed by isolation cuts each of which is separation created by cutting of the piezoelectric sheet to extend to the depth of thickness from the front side to the backside, while the piezoelectric sheet is still in one body in great part thereof. With such a construction adopted, since the moving parts and the fixed parts can be formed only by isolation cuts therein, thus facilitating fabrication of press means.

An optical switch of the present invention may have the piezoelectric sheet in which isolation cuts are formed to each form a comb-shaped configuration and by use of each tooth portion of each comb-shaped configuration, one of moving parts are formed. According to such a construction, plural piezoelectric members can be formed with good efficiency.

An optical switch of the present invention may have moving parts thereof formed by use of respective portions of the piezoelectric sheet each between two adjacent straight isolation cuts of a pair in parallel of plural straight isolation cuts formed in the piezoelectric sheet. According to such a construction, plural piezoelectric members can be formed with good efficiency.

An optical switch of the present invention has a piezoelectric member, which is a member of a flat plate, and only a requirement for which is that the flat plate is restrained from moving out from a peripheral end surface thereof. With such a construction adopted, since a piezoelectric member constituted of a flat plate member as a whole can deform the plate member, the plate member can be deformed such that opening/closing of a cut can be achieved without giving irreversible plastic deformation to the plate member.

It is more preferable that an optical switch of the present invention has piezoelectric members provided on the upper side and lower side of the plate member. According to this construction, at least one of the upper and lower sides of the plate member is selected and deformation can be generated on the selected one side, thereby enabling opening/closing a cut can be achieved with good efficiency.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Description will be given of embodiments of the present invention based on the accompanying drawings below.

First Embodiment

An optical switch of this embodiment has optical waveguides formed in an elastic material (for example polyimide). The optical switch of this embodiment has cut sections at cross-points of optical guides and by opening/closing the cut section, a changeover between straight propagation and reflection is enabled. When a cut section is open, all of the energy of light passing through a corresponding optical waveguide is reflected by an inner surface at the cut section of the optical waveguide to change propagation directions thereof. Conversely when the cut section is close, the light passes through the cut section to propagate straight without being affected any way.

Figure 1:
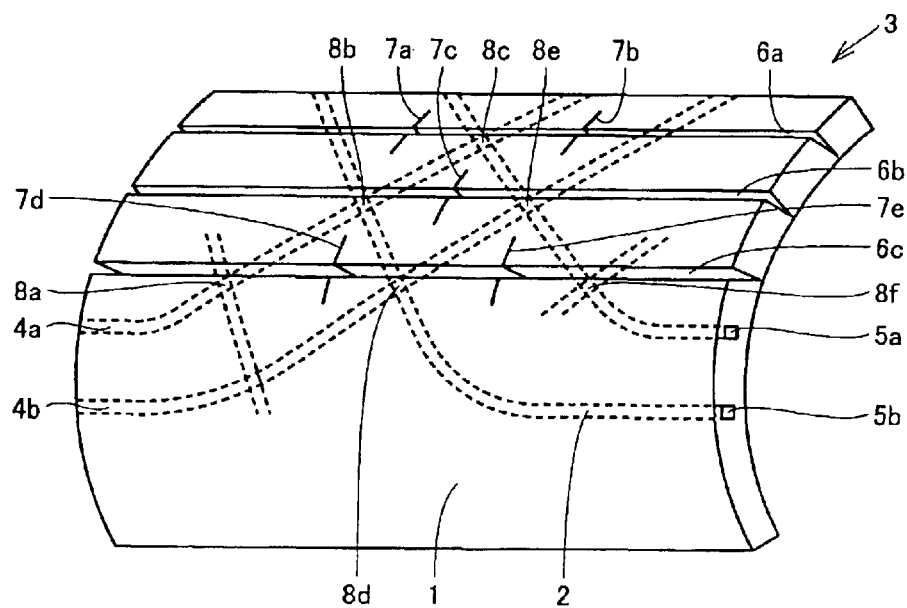
FIG. 1 is a perspective view showing an open state of cuts of an optical switch of a first embodiment of the present invention.

Referring to FIG. 1, detailed description will be given of the optical switch of this embodiment below. Shown in FIG. 1 is part of polymer optical waveguides 3 used in the optical switch. Optical waveguides 3 made of a polymer has first to third cut sections 6a to 6c each as a cut formed by cutting a polyimide film 1 thereinto with a sharp edge of a knife. Furthermore, optical waveguides 3 have first to fifth stress relaxation cut sections 7a to 7e formed perpendicular to first and third cut sections 6a to 6c, respectively, with two parts of a stress relaxation cut section on both sides of each of first to third cut sections 6a to 6c while traversing it. Note that in the present specification, the term cut section is one of partial separations obtained when a sheet member is partly separated by cutting in a depth direction and a lateral direction, wherein two opposed inner surfaces of each partial separation created by the cutting extend in a depth direction only to some point before the other side of the sheet member without fully reaching there, and partial separations are each shorter than a total distance between opposed sides of the sheet member and are aligned with one spacing or another between two adjacent partial separations, a full thickness portion being left between two adjacent partial separations, while a term a cut is a concept of a long continuous separation fully covering from one side of a sheet member to the other side thereof with a depth of cutting extending only to some point before the other side of the sheet member without fully reaching there, including a cut section described above.

In polymer optical waveguides 3, while first and second input ports 4a and 4b and first and second output ports 5a and 5b are shown in the figure for description, more input ports and more output ports may be provided. Furthermore, many optical waveguides 2 are formed in the interior of polyimide film 1 in correspondence to the input ports and output ports, respectively, and optical waveguides 2 intersect at cross-points 8a to 8f with each other.

Though not shown in FIG. 1, press means is provided in the vicinity of each of the cross-points as an opening/closing operation mechanism for a cut section 6, the press means pressing a region around the cross-point from one side to the other side. As the press means, a piezoelectric member constituted of a piezoelectric element is used in the optical switch of this embodiment.

An optical switch of this embodiment is the invention directed to the press means performing the opening/closing operation of the cut section and by use of a plate shaped piezoelectric unimorph element as the press means, the press means can be realized as a down-sized mechanism at low cost.

Detailed description will be given of a press means for an optical switch of this embodiment below, using FIGS. 3 to 6.

Figure 3:
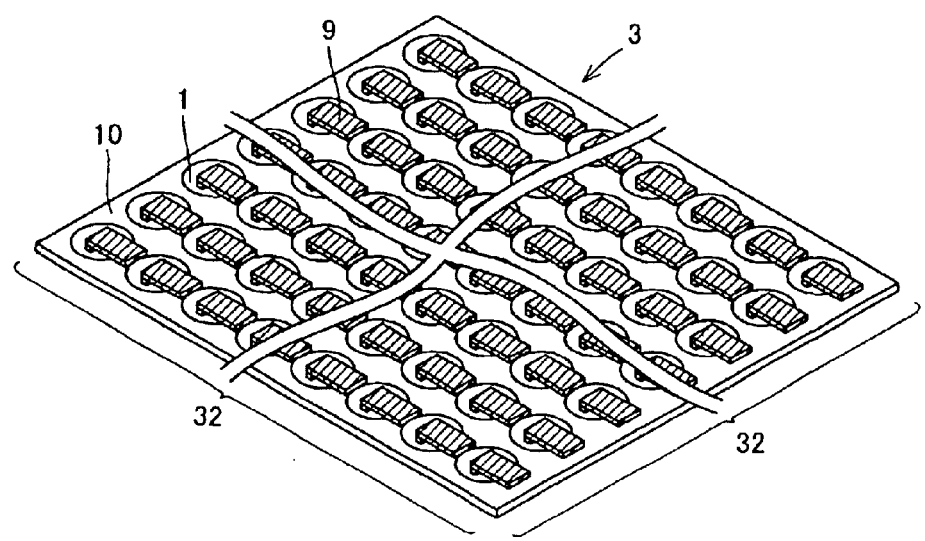
FIG. 3 is a representation showing an arrangement in a case where there are provided plural optical switches of the first embodiment.
Figure 4:
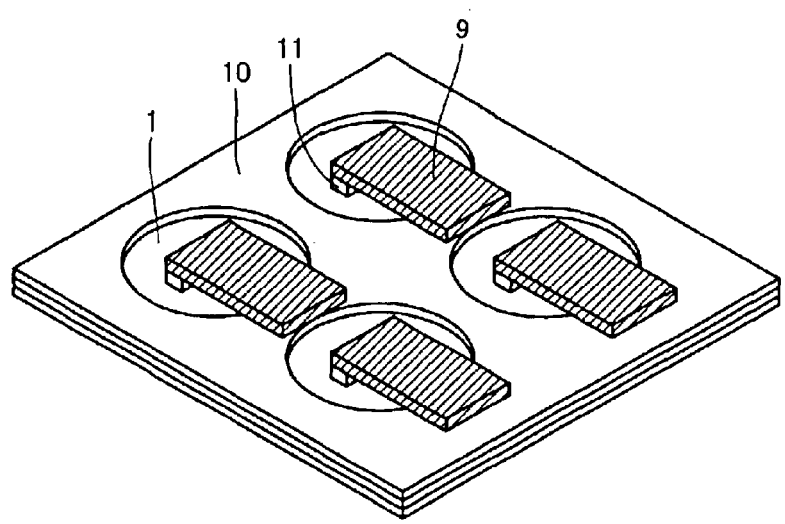
FIG. 4 is a partly enlarged version of the representation of FIG. 3.

An optical switch of this embodiment is constructed such that as shown in FIGS. 3 and 4, polyimide film 1 is sandwiched by spacers 10 at front and back sides thereof with through-holes exposing only regions around the cross-points. An end of piezoelectric member 9 constituted of a plate shaped piezoelectric unimorph is fixed to polyimide film 1 with spacer 10 interposing therebetween. In a case of a 32 times 32 optical switch, on a front side thereof, piezoelectric members 9 are arranged in a rectangular array of 32 rows and 32 columns. Furthermore, such a construction is provided on the backside thereof as well.

In this embodiment, each optical switch unit can has a sufficient displacement and force therefor only by pressing with a corresponding piezoelectric member 9 although each optical switch unit is downsized and thin in the shape. Furthermore, since each piezoelectric member 9 is supported by polyimide film 1, an advantage is achieved in that even if no flatness is held of a main surface of polyimide film 1, a clearance between a press section of each piezoelectric member 9 and polyimide film 1 can be kept at a normal value.

Figure 2:
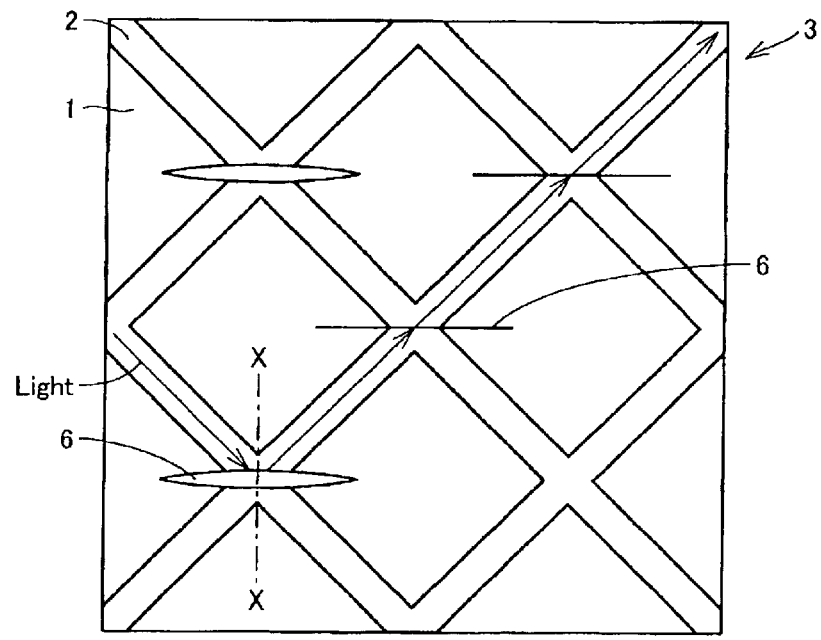
FIG. 2 is a plan view showing the open state of cuts of an optical switch of a first embodiment.

As shown in FIG. 3, piezoelectric members 9a and 9b are provided on the front and back sides of polyimide film 1 with spacers 10a and 10b interposing therebetween, in which polyimide film 1 there are formed polymer optical waveguides 2 whose sections are depicted with broken lines in FIG. 2. Press sections 11a and 11b pressing regions around of cut section 6 of polyimide film 1 are provided at ends of respective piezoelectric members 9a and 9b.

Figure 5:
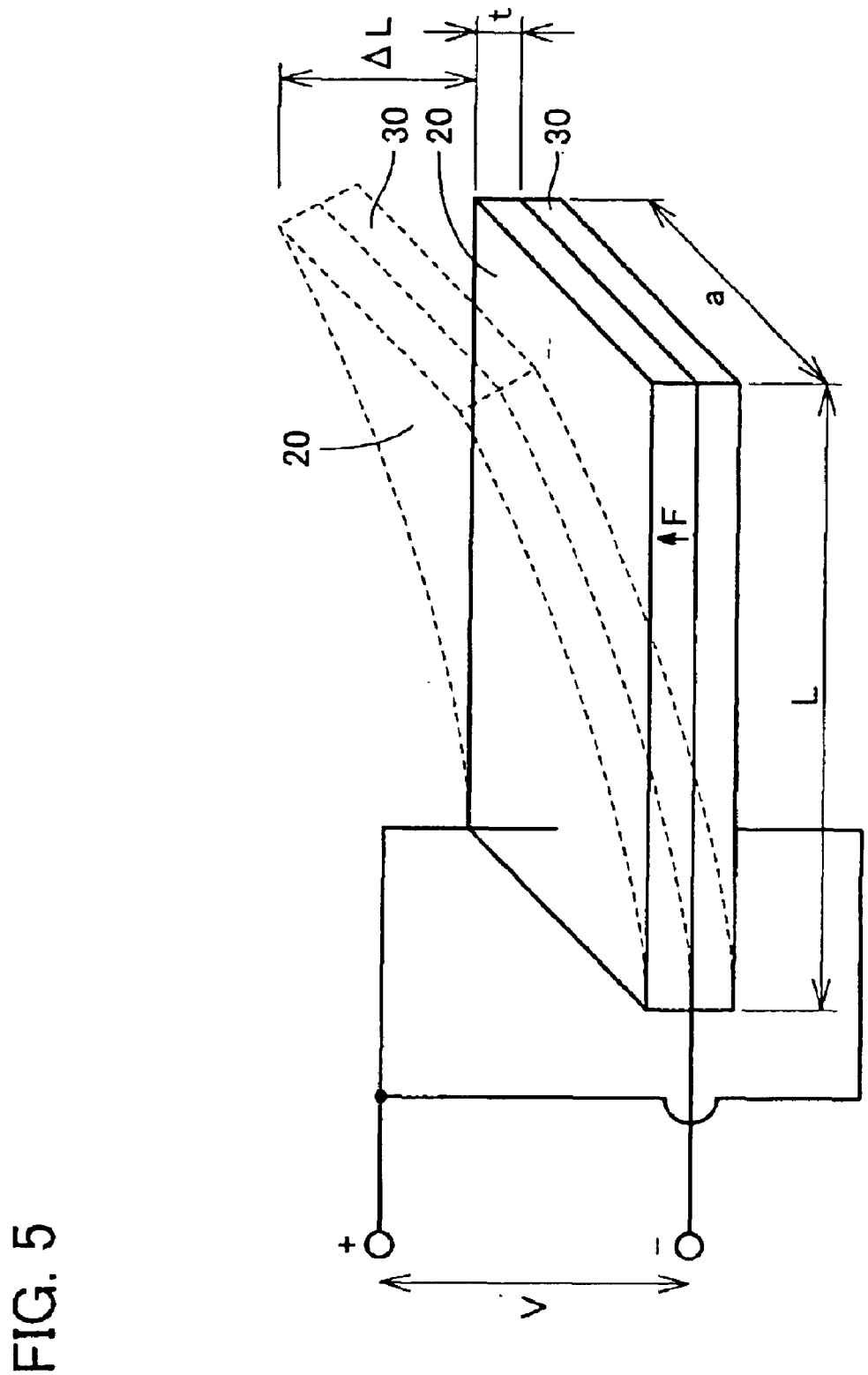
FIG. 5 is a diagram for describing a principle of operation of a piezoelectric member.

Now, description will be given of a principle of operation of a piezoelectric member constructed of a piezoelectric unimorph using FIG. 5. Piezoelectric member 9 is constituted of a piezoelectric plate 20 polarized in a depth direction and a metal plate 30 and electrodes are connected to surfaces of respective both plates. When a voltage is applied across piezoelectric plate 20, piezoelectric plate 20 is contracted by a piezoelectric effect to thereby bend piezoelectric member 9 upward as a whole as shown in FIG. 5.

Figure 6A:
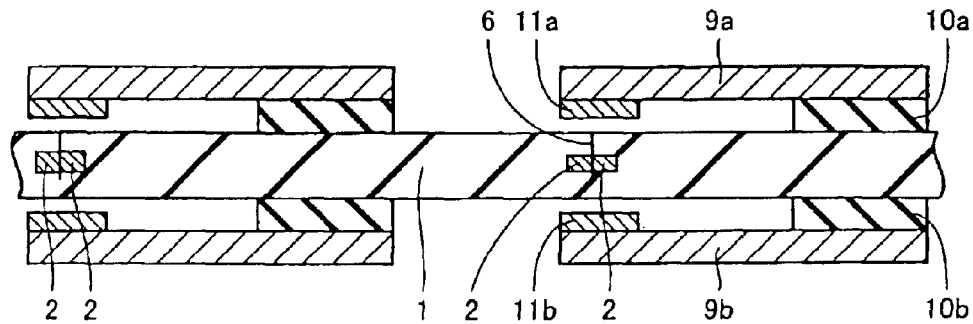
FIGS. 6A to 6D are sectional views for describing states where a cut of an optical switch of the first embodiment is opened/closed.
Figure 6B:
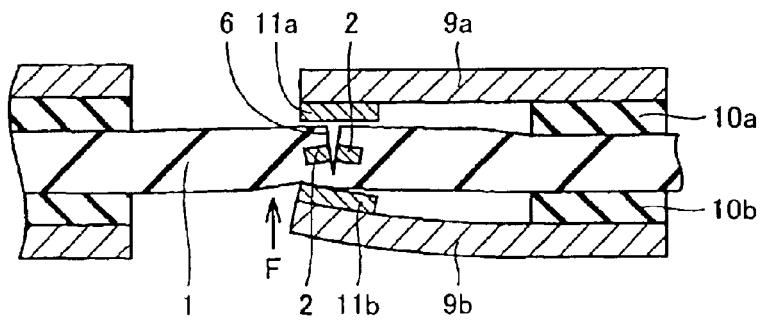

Then, description will be given of operation of an optical switch of this embodiment using the above principle of operation of a piezoelectric member. Piezoelectric member 9 of this embodiment is constructed such that as shown in FIG. 6A, not only are press sections 11a and 11b located above and below cut section 6 of polyimide film 1, but piezoelectric members 9a and 9b having respective press sections 11a and 11b at the fore ends thereof are also fixed to polyimide film 1 with spacers 10a and 10b interposing therebetween. When cut section 6 is opened, as shown in FIG. 6B, a voltage is applied across piezoelectric member 9b on the back surface such that press section 11b of piezoelectric member 9b bends toward cut section 6 to press polyimide film 1 locally upwardly from the back surface thereof; therefore, cut section 6 enters an open state. Note that in this state, no voltage is applied across piezoelectric member 9a on the upper side.

Figure 6C:
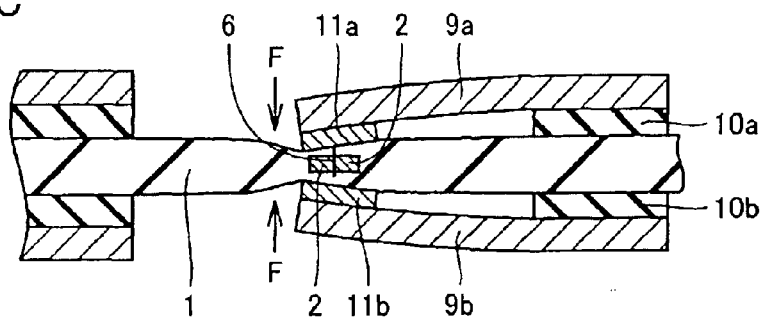

Furthermore, when cut section 6 is closed, as shown in FIG. 6C, piezoelectric members 9a and 9b are both applied with voltages across them such that press sections 11a and 11b are bent in the respective opposed directions toward cut section 6 of polyimide film 1. With such voltages applied, cut section 6 is deformed so as to be compressed in opposed directions from above and below, with the result that inner wall surfaces constituting cut section 6 are put into close contact with each other to assume a closed state.

Figure 6D:
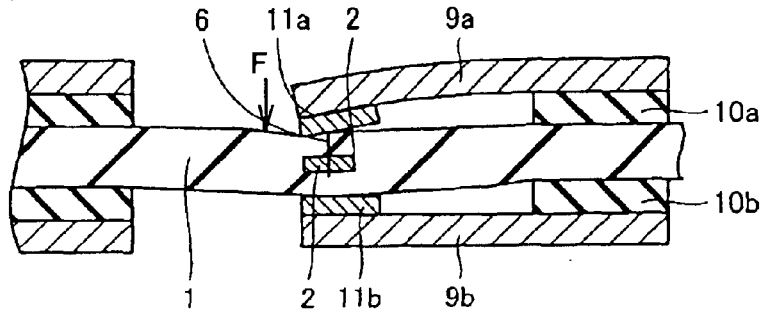

Alternatively, cut section 6 may be closed so as to assume a state shown in FIG. 6D instead of the state shown in FIG. 6C. Only piezoelectric member 9a on the front surface is applied with a voltage so as to bend press section 11a in the direction toward polyimide film 1 to thereby press polyimide film 1 down at cut section 6; therefore, cut section 6 assumes a closed state. Note that in this state, piezoelectric member 9b on the lower side is applied with no voltage.

Furthermore, note that a displacement $\Delta L$ and a generated force F in a piezoelectric unimorph element are expressed by the following formula:

$$\Delta L = \frac{3}{8}\left(\frac{L}{t}\right)^2 \cdot d_{31} \cdot V$$

$$F = \frac{t \cdot a}{L} \cdot \frac{d_{31}}{S_{11}^E} \cdot V,$$

where $d_{31}$ is a piezoelectric d constant and $S_{11}^E$ is a compliance constant.

A piezoelectric member of this embodiment in use has dimensions of L=500 $\mu$m in length, a=700 $\mu$m in width and t=22.4 $\mu$m in thickness, with a piezoelectric d constant $d_{31}$=-262×10$^{-1}$ m$^2$/V and a compliance constant $S_{11}^E$=15× 10$^{-12}$ m$^2$/N. A voltage V=200 V is applied across the piezoelectric member and then, a displacement $\Delta L$=10 $\mu$m and a generated force F=0.1 N. Under such conditions adopted, in a case where a thickness of polyimide film 1 is 50 $\mu$m, a depth of a cut section is 40 $\mu$m and a pitch of cut sections is 700 $\mu$m, a displacement and a force necessary for closing/opening of cut section 6 can be given thereto.

Then, referring to FIGS. 6A to 6C, description will be given of operation of change-over between optical paths. FIGS. 6A to 6C show change-over operation in sectional view taken on line X—X of FIG. 2. Regions around cross-points 8a to 8f of optical waveguides 2 are shown in an enlarged state in FIGS. 6A to 6C. In a state of FIG. 6A where piezoelectric members 9a and 9b are not pressed to polyimide film 1, and in a state of FIG. 6C where piezoelectric members 9a and 9b are pressed to polyimide film 1 from above and below it, inner wall surfaces of cut section 6 of optical waveguide 2 are in physical close contact with each other (in the latter case by pressure from piezoelectric member 9); therefore, signal light can propagate through cut section 6 without reflection of any part of light energy there. On the other hand, in a state of FIG. 6B where only piezoelectric member 9b is pressed to polyimide film 1, signal light propagating through optical waveguide 2 is reflected by an inner wall surface of cut section 6.

Further description will be continued of the operation referring to FIG. 1. For example, in optical switch having polymer optical waveguide 3 of FIG. 1, piezoelectric members 9 (see FIG. 2) are pressed to cross-points 8a, 8b, 8e and 8f except cross-point 8c left not pressed. In this case, at cross-point 8c, optical waveguide 2 intersects with cut 6a at 45 degrees; therefore all of the energy of incident light signal is reflected by an inner surface at cut 6a. As a result, signal light launched into first input port 4a can be outputted from first output port 5a.

Furthermore, in a case where piezoelectric members 9 are pressed to cross-points 8a and 8d while cross-point 8b is left not pressed, signal light launched into first input port 4a can be outputted from second output port 5b.

In a similar manner, by selectively pressing one or more cross-points among cross-points 8a to 8f in a suitable way, incident light on first and second input ports 4a and 4b can be outputted from any of first and second output ports 5a and 5b.

Note that, stress relaxation cut section 7c is formed between cross-points 8b and 8e. Therefore, even when cross-point 8b is pressed by piezoelectric member 9, cross-point 8e can be prevented from being strained since no deformation at cross-point 8b is transferred to cross-point 8e. In such a way, by providing stress relaxation cut sections between cross-points, connection (straight propagation)/reflection of light can be controlled at each cross-point independently of any of other adjacent cross-points.

An optical switch in this embodiment, as described above, has a function that change-over between connection/reflection of light in optical waveguide 2 is realized by contraction and expansion of optical waveguide 2 fabricated from a plate member made of a polymer, caused by pressure from piezoelectric member 9; therefore, more correct change-over can be realized, as an advantage, compared with a prior art practice in which a refractive index matching oil is used. Furthermore, since optical waveguides are physically connected with each other upon connection, connection can be achieved with an effect of an extremely small connection loss.

Moreover, if a structure is adopted that polyimide film 1 on both sides of cut section 6 as a cut is partly connected at a region around cut section 6, mutual displacement of optical waveguide 2 on both sides of cut section 6 can be prevented from occurring as shown in FIG. 1.

In addition, since cut section 6 may be formed as a separation by cutting into polyimide film 1 with a sharp edge of a knife, a cut section with no scattering of light can be formed at a cross point by use of a feature that inner wall surfaces of cut section 6 can be formed as a smooth surface by knife cutting.

Furthermore, in order to change over between a state where a clearance of a cut is equal to or less in width than ¼ times as large as a wavelength of light on which a signal is carried and a state where a clearance of a cut is more in width than ¼ times as large as a wavelength of light on which a signal is carried, a method is adopted in which cut section 6 is pressed by a press operation of piezoelectric members 9a and 9b. Therefore, a clearance can be equal to or narrower in width than ¼ times as large as a signal wavelength with ease. For this reason, a precision with which a clearance of cut section 6 is controlled may be relatively low, thereby enabling an optical switch to be manufactured at low cost.

Second Embodiment

Description will be given of an optical switch of a second embodiment of the present invention using FIGS. 7 to 9. First of all, an overall construction of an optical switch of this embodiment is taken up with reference to FIGS. 7 and 8 in the description. Polyimide film 1 is sandwiched at front and back sides thereof by spacers 10 with through-holes exposing only regions around the cross-points and piezoelectric members 9 constituted of a disc shaped piezoelectric bimorph are buried in the holes. In a case of a 32 times 32 optical switch, on a front side thereof, piezoelectric bimorphs are arranged in a rectangular array of 32 rows and 32 columns. Furthermore, such a configuration is provided on the backside thereof as well. Note that while in this embodiment, disc shaped piezoelectric members are used as an example of a flat plate, only a requirement is to be a flat plate that is installed in a state where the flat plate is restrained from moving out from a peripheral end surface thereof, which may be rectangular or of the like shape.

In this embodiment, since polyimide film 1 can be deformed with piezoelectric member 9 as a whole, polyimide film 1 can be deformed without giving irreversible plastic deformation thereto.

Figure 7:
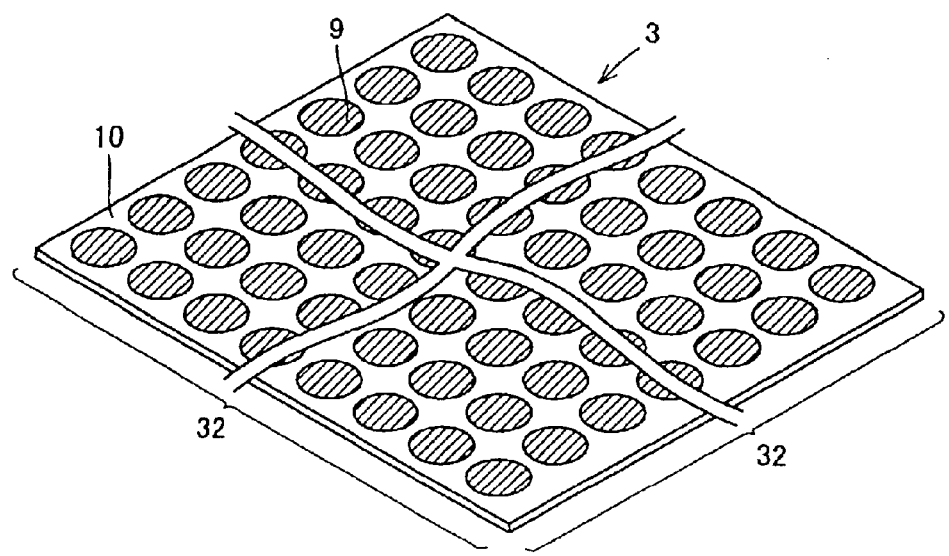
FIG. 7 is a representation showing an arrangement in a case where there are provided plural optical switches of a second embodiment of the present invention.
Figure 8:
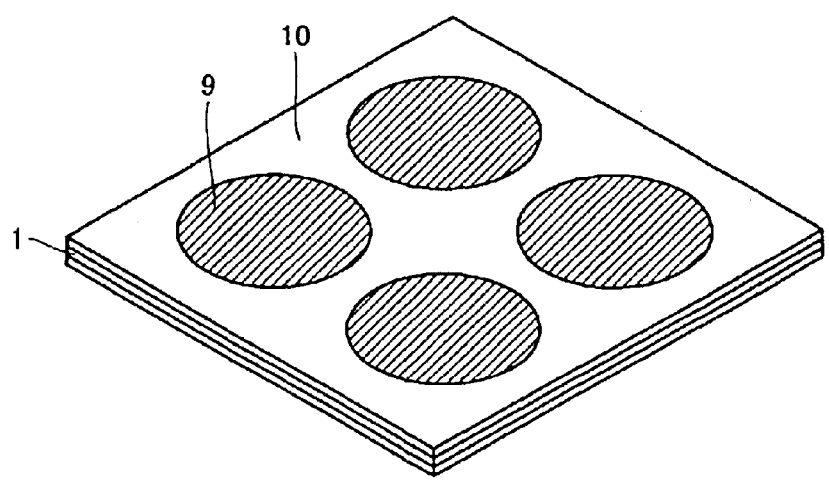
FIG. 8 is a partly enlarged version of the representation of FIG. 7.

In this embodiment, as shown in FIGS. 7 and 8, the whole body of piezoelectric member 9 constituted of a piezoelectric unimorph is caused to adhere to polyimide film 1. Piezoelectric member 9 is fixed at both ends thereof by support sections. In this state, when a voltage is applied, a length of the piezoelectric element changes, which deforms the element body in one of opposed directions, upward or downward, at the central portion thereof to a concave shape or a convex shape, which deformation in the concave shape or the convex shape further bends polyimide film 1 itself in the same way.

Figure 9A:
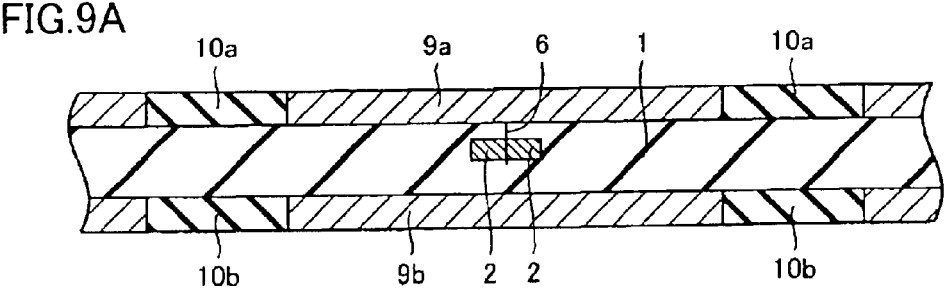
FIGS. 9A to 9D are sectional views describing states where a cut of an optical switch of the second embodiment is opened/closed.
Figure 9B:
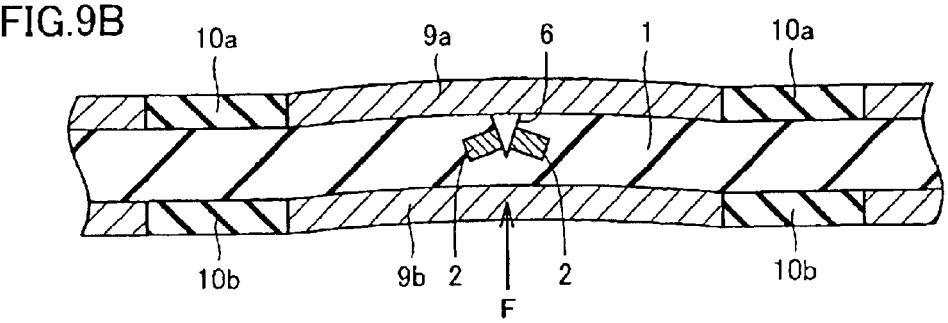

Then, description will be given of opening/closing operation of a cut section using FIGS. 9A to 9D. FIGS. 9A to 9B show a change-over operation in sectional views taken on line X—X of FIG. 2. When cut 6 is opened, a region around cut 6 changes from a state shown in FIG. 9A to a state shown in FIG. 9B, wherein piezoelectric member 9b is applied with a voltage thereacross so as to bend to upward convexity to thereby push polyimide film 1 upward from the back surface thereof, with the result of an open state of cut section 6. In this situation, no voltage is applied to piezoelectric member 9a on the front surface side.

Figure 9C:
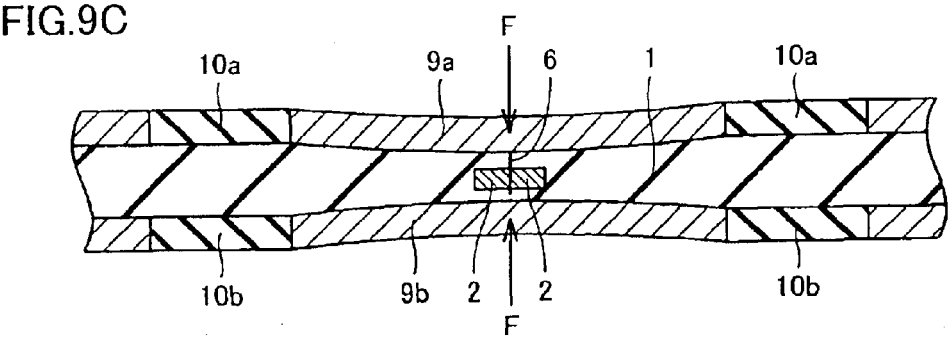

On the other hand, when cut section 6 is closed, a region around cut section 6 changes from a state shown in FIG. 9B to a state shown in FIG. 9C, wherein piezoelectric members 9a and 9b are applied with voltages so as to both bend toward cut section 6 of polyimide film 1 in respective opposed directions to thereby contract the region around cut section 6, with the result that inner wall surfaces constituting cut section 6 are put into close contact with each other to thereby enter a closed state.

Figure 9D:
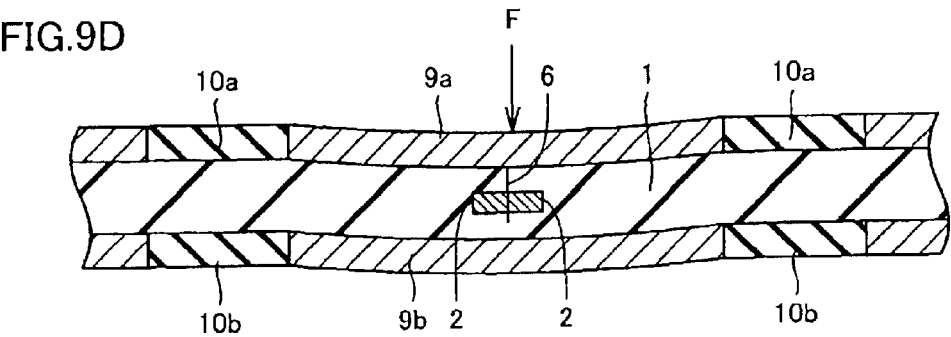

Alternatively, as a closed state of cut 6, a state shown in FIG. 9D may be adopted as substitute for that shown in FIG. 9C. In the state shown in FIG. 9D, only piezoelectric member 9a on the front surface is applied with a voltage so as to bend toward polyimide film 1 to downward concavity to push polyimide film 1 downward with the result of a closed state of cut section 6. Note that in this state no voltage is applied to piezoelectric member 9b on the backside.

Third Embodiment

In this embodiment, description will be given of a construction of an optical switch and a fabrication process for the same in which a group of piezoelectric members shown in the first and second embodiments can be fabricated with good efficiency.

Figure 10:
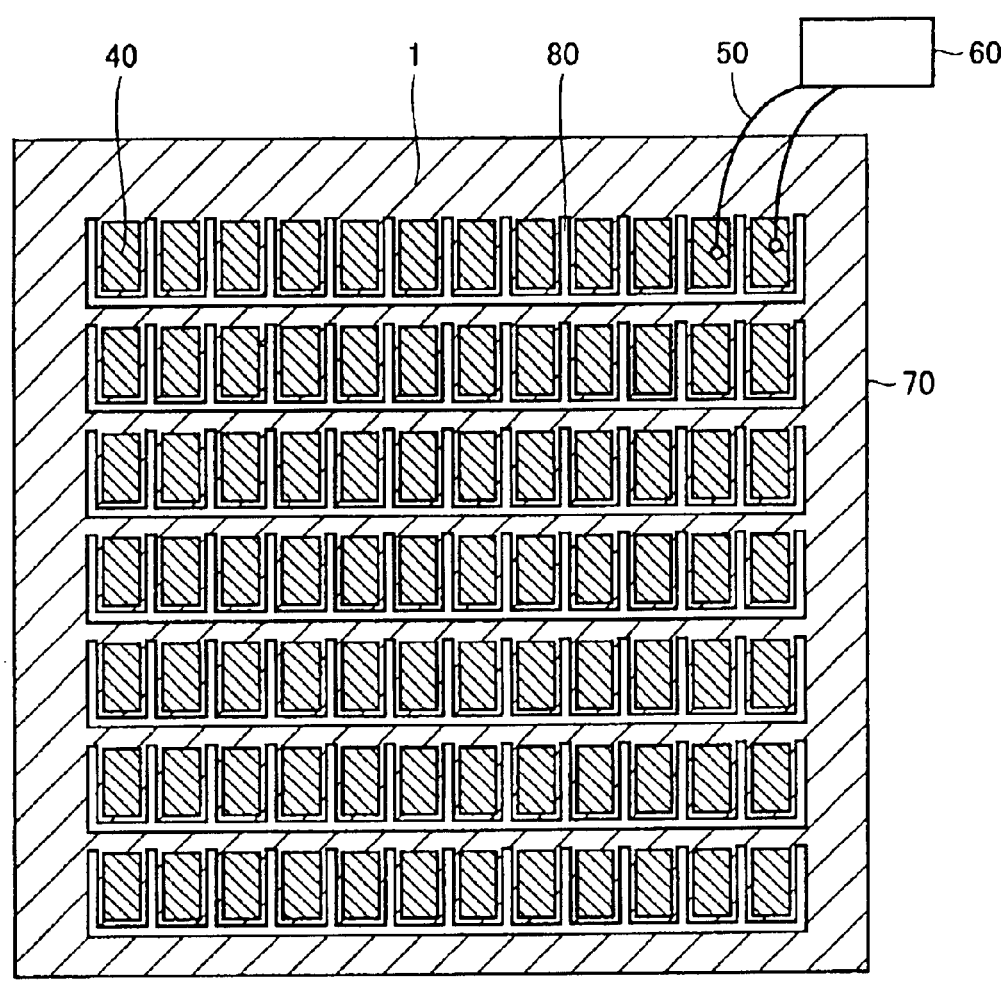
FIG. 10 is a representation for describing an optical switch of a third embodiment of the present invention.
Figure 11:
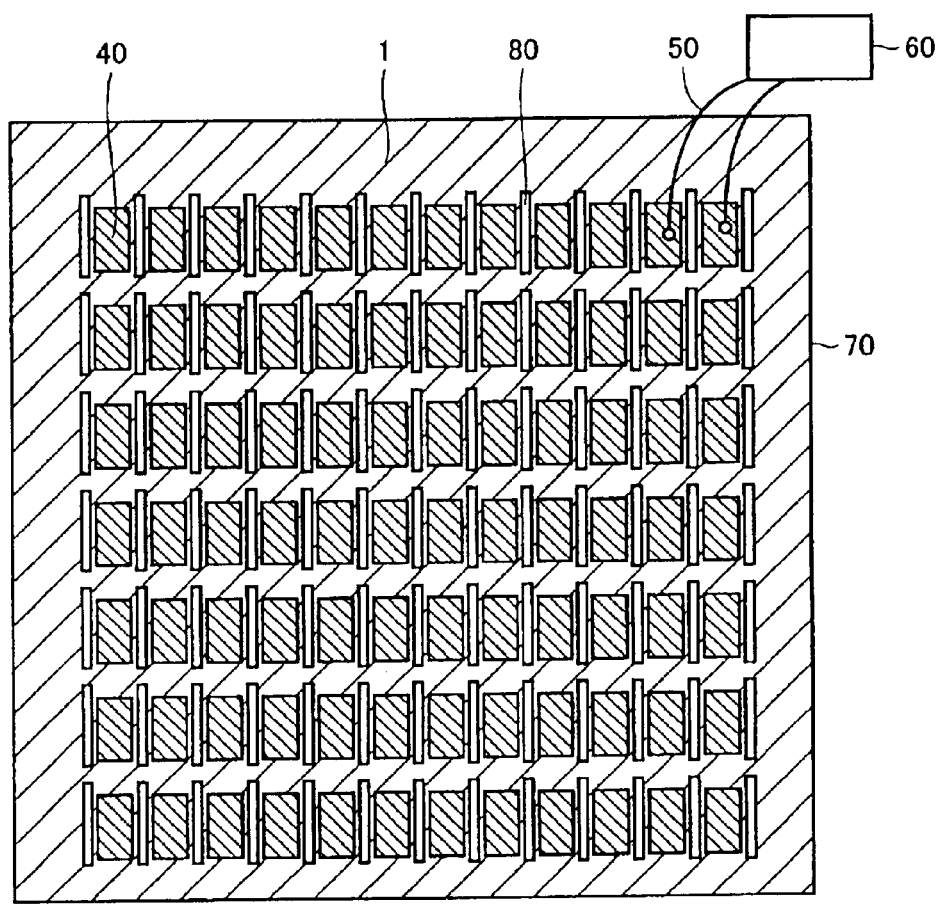
FIG. 11 is a representation for describing an optical switch of the third embodiment.
Figure 12:
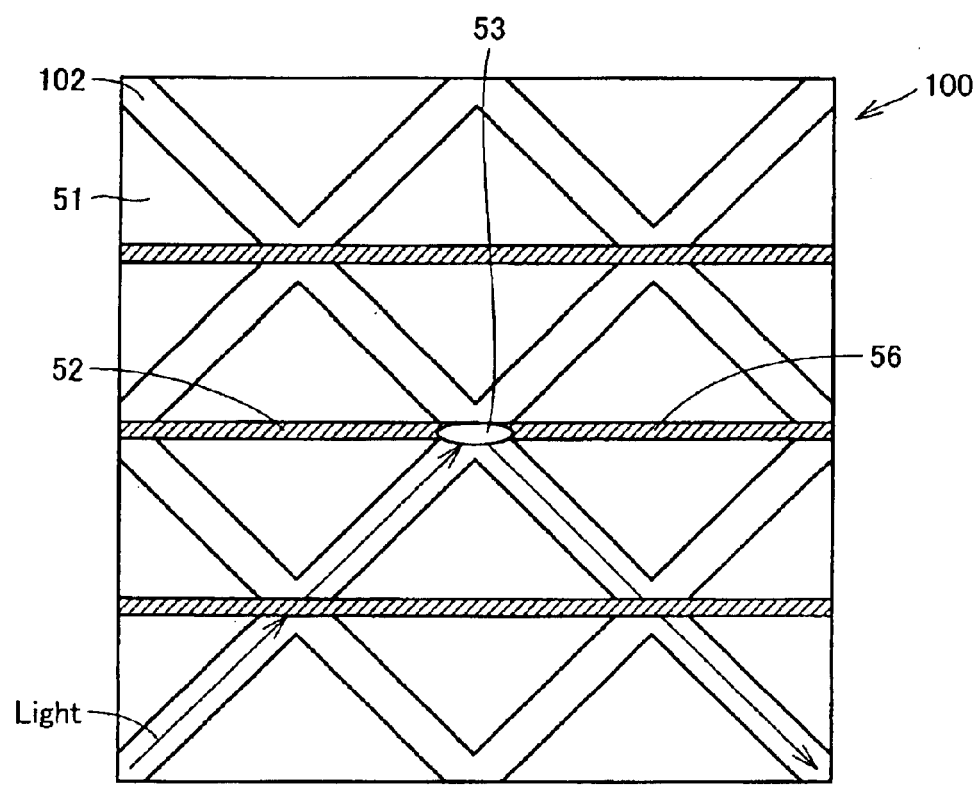
FIG. 12 is a plan view for describing a prior art optical switch.

Usually, it is very hard to install many of tiny piezoelectric members in arrangement of good accuracy. Therefore, constructions as shown in FIGS. 10 and 11, as examples, are adopted for arrangement of a group of piezoelectric members each shown in FIG. 1. Description will be given of an optical switch of this embodiment using FIGS. 10 and 11.

First of all, a piezoelectric film with the same size as that of a waveguide substrate is prepared and a metal plate is fixed on a back surface thereof. Furthermore, as shown in FIG. 10, an isolation cut 80 is formed in piezoelectric film 1 so as to form a comb-shaped configuration of piezoelectric members. By doing so, each tooth portion of the comb-shaped configuration is to work as a piezoelectric member. Electrodes 40 are formed on surfaces of respective teeth portions of the comb-shaped configuration, followed by wiring 50. Note that isolation cut is such that separation created by cutting of a piezoelectric sheet to extend to the depth of thickness from the front side to the backside, while the piezoelectric sheet is still in one body in great part thereof.

On the other hand, wiring for earth 70 is provided to a metal plate on a back surface. Control of an optical switch is performed by a controller 60. According to this process, no necessity arises for fixing tiny piezoelectric members individually on polyimide film 1, but one piezoelectric film 1 prepared in one step has only to be fixed on polyimide film 1, which makes fabrication of an optical switch simplified.

Furthermore, in a case where a group of piezoelectric member of the second embodiment is formed, it is only required that, as shown in FIG. 11, rows of plural short straight isolation cuts 80 are formed in the piezoelectric sheet in a manner such that adjacent short straight isolation cuts 80 of each pair in parallel sandwiches one tiny piezoelectric member 40 therebetween. Note that by creating isolation cuts in a piezoelectric sheet so as to each be in the shape of a circle, a rectangle or the like figure to contain a tiny piezoelectric member, the piezoelectric members described in the second embodiment can be formed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical switch comprising:

a plate member, constituted of an elastic material, and having first and second optical waveguides intersecting with each other at a cross-point in the interior thereof and a cut formed so as to traverse said cross-point; and press means, provided on at least one of upper and lower sides of main surfaces of said plate member, and pressing said cut to open or close said cut, wherein when said cut is open, light propagating through said first optical waveguide is reflected by an inner wall surface of said cut to then, propagate through said second optical waveguide, while when said cut is close, light passes through said cut to keep on propagating straight through said first optical waveguide and said press means is formed from an piezoelectric member that deforms according to an pizoelectric effect.

2. The optical switch according to claim 1, wherein said piezoelectric member comprises: a fixed part fixed to said plate member; and a moving part not fixed to said plate member, wherein a position of said moving part changes upward or downward relative to said fixed part by a piezoelectric effect, such that said moving part presses said cut.

3. The optical switch according to claim 2, wherein said press means are constituted of a piezoelectric sheet having said fixed parts and said moving parts, wherein each of said moving parts may be formed using one of portions formed by isolation cuts each of which is separation created by cutting of said piezoelectric sheet to extend to the depth of thickness from the front side to the backside, while said piezoelectric sheet is still in one body in great part thereof.

4. The optical switch according to claim 3, wherein in said piezoelectric sheet, isolation cuts are formed to each form a comb-shaped configuration and by use of each tooth portion of each comb-shaped configuration, each of said moving parts is formed.

5. The optical switch according to claim 3, wherein said moving parts are formed by use of respective portions of said piezoelectric sheet each between two adjacent straight isolation cuts of a pair in parallel of plural straight isolation cuts formed in said piezoelectric sheet.

6. The optical switch according to claim 1, wherein said piezoelectric member is a member of a flat plate, and only a requirement therefor is that said flat plate is restrained from moving out from a peripheral end surface thereof.

7. The optical switch according to claim 1, wherein said piezoelectric members are provided on said upper side and lower side, respectively, of said plate member.

* * * * *